United States Patent [19]
Rey

[11] Patent Number: 5,899,309
[45] Date of Patent: May 4, 1999

[54] HYDRAULIC CLUTCH CONTROL, NOTABLY FOR MOTOR VEHICLES

[75] Inventor: Frédéric Rey, Lyons, France

[73] Assignee: Valeo, Paris, France

[21] Appl. No.: 08/737,610

[22] PCT Filed: Mar. 14, 1996

[86] PCT No.: PCT/FR96/00392

§ 371 Date: Feb. 11, 1997

§ 102(e) Date: Feb. 11, 1997

[87] PCT Pub. No.: WO96/28667

PCT Pub. Date: Sep. 19, 1996

[30] Foreign Application Priority Data

Mar. 16, 1995 [FR] France .................................. 95 03183

[51] Int. Cl.⁶ .................................................. F16D 25/08
[52] U.S. Cl. ...................................... 192/85 C; 192/91 R
[58] Field of Search .............................. 192/85 C, 91 R; 92/165 R; 74/501.5 R, 500.5

[56] References Cited

U.S. PATENT DOCUMENTS

| | | | |
|---|---|---|---|
| 2,098,674 | 11/1937 | Price et al. ............................. | 192/91 R |
| 2,486,787 | 11/1949 | Johnson ............................. | 92/165 R X |
| 3,327,817 | 6/1967 | Ivanchich ............................ | 192/91 R X |
| 3,709,340 | 1/1973 | Murakami et al. ................... | 192/91 R X |
| 4,234,066 | 11/1980 | Toyota et al. ........................ | 192/91 R X |
| 5,014,603 | 5/1991 | Navarette et al. ..................... | 92/165 R |
| 5,404,981 | 4/1995 | Romer et al. ........................ | 192/91 R X |

FOREIGN PATENT DOCUMENTS 42 20 020  1/1993  Germany .
1 550 613  8/1979  United Kingdom .

*Primary Examiner*—Rodney H. Bonck
*Attorney, Agent, or Firm*—Longacre & White

[57] ABSTRACT

Hydraulic clutch control, having a clutch release fork (25), a control member (8) capable of acting in traction on the clutch release fork (25), a hydraulic receiver (1) having a fixed cylinder (2) mounted on a counter-support (5) and a piston (4) engaged so as to slide sealingly in the cylinder (2) and defining therein a chamber (6). The control member (8) enters inside the piston (4) of tubular shape like the cylinder (2). This member is mounted in an articulated manner on the fork (25) and on the back end of the piston.

10 Claims, 2 Drawing Sheets

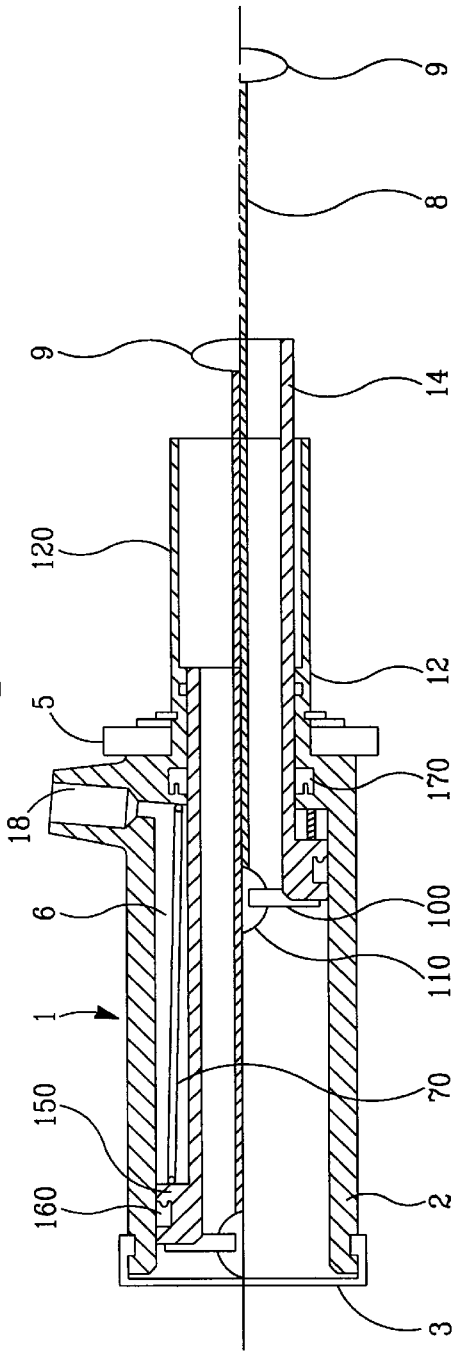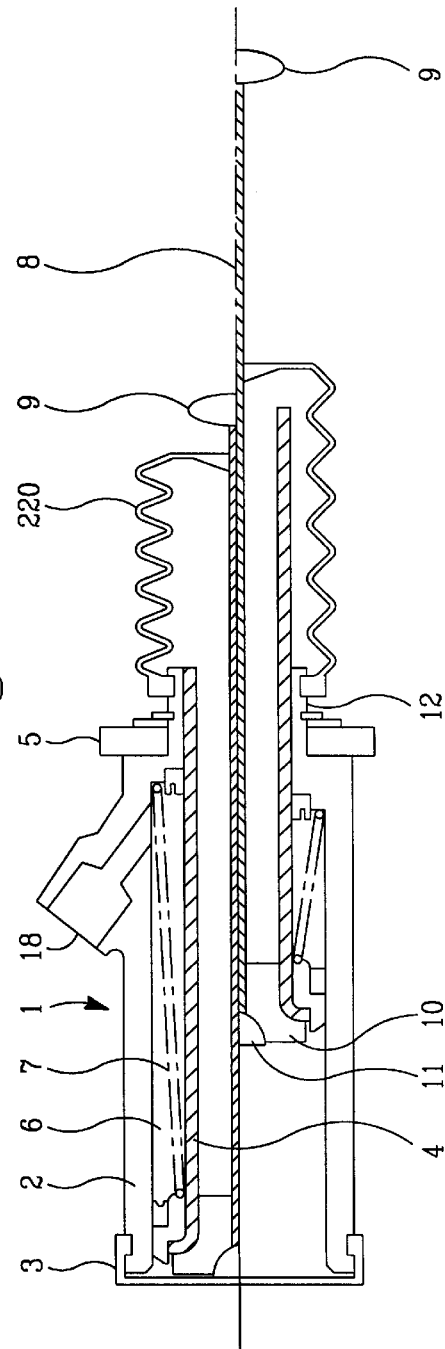

HYDRAULIC CLUTCH CONTROL, NOTABLY FOR MOTOR VEHICLES

The present invention concerns clutch controls and more particularly hydraulic clutch controls, notably for motor vehicles.

As is known, a clutch release control has (FIG. 1) a clutch release fork 25 capable of being mounted pivoting on a fixed support such as the housing of a gearbox.

This fork 25 cooperates with a clutch release bearing 26 which, when actuated, is adapted to stop the elastic compressing action of an elastic diaphragm 27 on a thrust plate 28 of a friction clutch 29, of which a reaction plate 30 and friction disc 31 can be seen.

The means for tilting the diaphragm 27 on a cover 30A fixed to the plate 30 are depicted at 27A.

For the record, it should be stated that the clutch is normally engaged, the friction linings of the friction disc 31 being gripped between the reaction plate 30 and thrust plate 28 under the action of the elastic load exerted by the diaphragm 27.

In order to disengage the clutch, it is necessary to act here by pulling on the clutch release fork 25 in order to make it tilt and to move the clutch release bearing 26 to the left of FIG. 1 in order to make the diaphragm 27 pivot and to cancel the load exerted by the said diaphragm on the thrust plate 28 in order to release the friction disc 31.

Here the control of the clutch release fork is effected with the aid of a cable 101 actuated by the clutch pedal.

It was proposed in the document DE-A-42 20 020, notably for reasons of comfort, that the cable control be replaced by a hydraulic control.

This hydraulic control has a hydraulic receiver having a fixed cylinder mounted on a counter-support fixed to a fixed support of the vehicle and a piston engaged so as to slide sealingly in the cylinder in order to define therein a chamber of variable volume connected to a transmitter controlled by the clutch pedal.

In this document, the piston rod constitutes a control member capable of acting in traction on the clutch release fork, being mounted in an articulated manner on the said fork by means of a drive bearing.

In this type of control, the clutch release fork, when operated, effects a movement in an arc of a circle whilst the piston moves in a rectilinear manner, so that the cylinder is mounted on a counter-support fixed to the fixed support by means of a bearing made of elastic material in order to compensate for the pendular movement of the rod. This arrangement complicates the control and is not optimal in respect of the freedom of movement of the piston. In addition, it leads to a loss in efficiency owing to the presence of the elastic bearing.

The object of the present invention is to overcome these drawbacks.

According to the invention, a hydraulic control of the type indicated above is characterised in that the cylinder is of tubular shape, in that the piston is of tubular shape and has at a back end a guiding projection designed to cooperate with the internal bore of the cylinder and directed radially outwards, whilst the cylinder has at a front end a guiding projection designed to cooperate with the outer periphery of the piston and directed radially inwards, and in that the control member enters inside the piston of the receiver and is mounted at one of its ends in an articulated manner on the clutch release fork and at the other end so as to articulate on the back face of the piston of the hydraulic receiver.

According to one embodiment the control member is a cable acting between two bearings coupled respectively to the back face of the piston and to the clutch release fork.

In a variant, a rod is mounted so as to articulate on the clutch release fork and at the other of its ends so as to articulate on the back face of the piston.

By virtue of the invention, the piston is pulled by means of a cable connected to the clutch release fork or by means of a rod mounted so as to articulate on the piston and on the clutch release fork, in order to take into account the kinematic differences between the movement of the clutch release fork in an arc of a circle and the rectilinear movement of the piston.

It will be appreciated that the small movement of the control member in an arc of a circle is due to the fact that it is mounted so as to articulate at the rear of the piston. The movement of the control member is of a smaller amplitude than if it had been mounted at the front of the piston.

Thus, jamming of the piston is prevented in a simple and economical manner. In addition, it is possible to mount the cylinder of the receiver fixedly on the counter-support, enabling the efficiency of the control to be improved as there is no elastic bearing to compress as in the prior art.

In addition, it is simple to house a spring in the control chamber, the said spring acting between the two guiding projections in order to pull on the control member and to exert a pre-load on the clutch release fork.

It will be appreciated that the cylinder and the piston are of simple shape and that the receiver is axially compact. Finally, this solution requires a minimum number of joints, namely one joint per guiding projection, so that a single joint is axially movable (the one associated with the piston).

Advantageously, the piston is in two parts, namely a tubular part (the piston proper) and the guiding projection, the two being held together by a pre-loading spring acting on the control member in order to push the fork so that this exerts a pre-load on the clutch release bearing. By virtue of this arrangement, the piston is simply made from two materials, one of which is adapted for its guidance.

Advantageously, the cylinder of the receiver has a nose by means of which it bears against its associated counter-support. The nose enables easy mounting on its counter-support.

Thus the counter-support can consist of the sheath stop of a conventional cable control and advantageously the cylinder offers, by virtue of its nose, a guiding area for its associated piston.

In order to facilitate mounting, to limit the movement of the piston and to protect the control chamber against the ingress of dust and other contaminants, the cylinder is advantageously closed by a part attached to the said cylinder (the bottom thereof) such that it is easy to effect the mounting of the piston and of the associated end of the control member.

It will be appreciated that the cable control allows a better movement of the piston and reduces risks of jamming.

The description which follows illustrates the invention with reference to the accompanying drawings, in which:

FIGS. 3 and 4 are views identical to FIG. 2 of other example embodiments.

Figure 2:
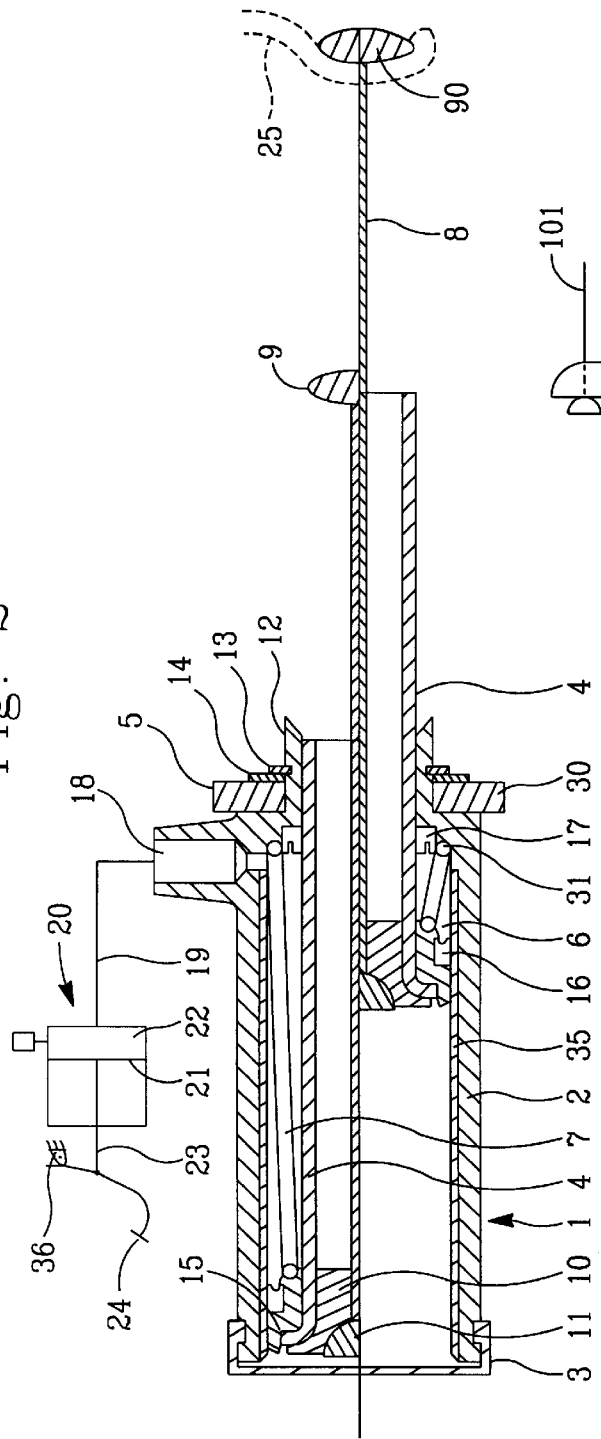
FIG. 2 is a view in section of a hydraulic control according to the invention, the upper part of the figure corresponding to the retracted position which the piston occupies when the clutch is disengaged, whilst the lower part of this figure corresponds to the extracted position which the piston occupies when the clutch is engaged.

In the embodiment depicted in FIG. 2, which concerns, by way of non-limitative example, an application of the invention in a hydraulic control circuit of a clutch of a motor vehicle, a master cylinder of this hydraulic circuit can be seen at 20. The master cylinder 20 has a cylinder 22 and a piston 21 mounted sliding in the cylinder 22 and defining in this cylinder a chamber of variable volume.

The piston 21 is controlled by control means, here a clutch pedal 24, mounted pivoting on a fixed part 36 of the vehicle. This piston 21 is controlled by means of a rod 23 connected to the clutch pedal 24.

In a variant, not depicted, the control means have an assistance device interposed between the piston 21 and the clutch pedal 24 and controlled by the said pedal.

The master cylinder 20 is connected, in a manner known per se, to a reservoir and constitutes a transmitter connected by a conduit 19 to a hydraulic receiver 1 according to the invention.

The receiver 1 has a cylinder 2 in which a piston 4 is engaged so as to be able to slide. The piston 4 defines in the cylinder 2 a chamber 6 of variable volume, which is connected by an inlet 18 to the conduit 19 and master cylinder 20.

Figure 1:
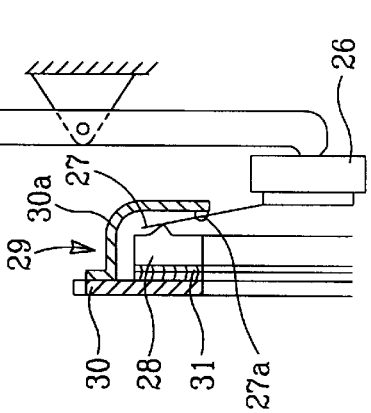
FIG. 1 is a schematic view of a piston clutch with its clutch release fork controlled by a cable.

The piston 4 is subjected to the action of a return spring 7 and is adapted to act by pulling the clutch release fork 25 of FIG. 1 by means of a control member 8 capable of acting in traction on the clutch release fork 25 by being mounted in an articulated manner on the said fork 25 with the aid of a drive bearing 9.

The control member 8 is a cable acting between two bearings articulated respectively on the piston 4 and on the clutch release fork 25. This member is thus coupled to the piston 4 of the receiver 1, being mounted, according to one characteristic of the invention, so as to articulate on the back face thereof.

Here, the cylinder 2 is mounted on a counter-support 5 fixed to a fixed part of the vehicle, in this case the gearbox housing.

To this end, the cylinder 2 has at its front end a nose 12 penetrating inside its fixed, centrally perforated counter-support 5. This nose 12, of tubular shape, thus defines a shoulder 30 of roughly transverse orientation. This nose 12 passes through the aperture of the counter-support 5 and has a groove for receiving a circlip 13, with a spacing washer 14 being interposed between the circlip 13 and the counter-support 5.

Thus the counter-support 5 is sandwiched between the shoulder 30 and the washer 14 so that the cylinder 2 is fixed on the fixed counter-support 5.

It will be appreciated that the mounting of the cylinder 2 is effected easily simply by slipping axially into the aperture of the counter-support 5 and locking by means of the circlip 13.

The cylinder 2 can thus be mounted in the sheath stop usually present on the gearbox housing for mounting a cable control acting in traction on the clutch release fork.

Thus the hydraulic control device according to the invention is mounted in place of a conventional cable control. Here, the cylinder 2 is of tubular shape and has a front face delimited by the internally bored nose 12 and a back face closed by a closing cap 3 mounted by means of snap-in connection, or as a variant by screwing, on a tubular body 2 in one piece with the nose 12.

The body 2, of simple shape and made of mouldable material, is advantageously made of plastic material with a low coefficient of friction so that the nose 12 offers internally a guide surface for the piston 4. The body 2 constituting the cylinder 2 is internally stepped and thus has an internal bore with a change in diameter at its nose 12.

The piston 4 is of tubular shape and has a tubular part, here made of metal 4, guided by the nose 12 at one of its ends (its front end) and by a guiding part 15 at the other of its ends (its back end). For this purpose, the back end of the tube 4 has a radial collar 32 for the axial retention of the part 15. A shouldered part 10, here made of plastic, rests on the back face, turned towards the cap 3, of the collar 32 and penetrates inside the tube 4.

The part 10 to a certain extent constitutes a plug. This plug is hollowed centrally for the installation of a control bearing 11, here of hemispherical shape. This bearing 11 is fixed to the cable 8 which, according to one characteristic of the invention, passes through the piston 4.

The control member 8 is thus, according to the invention, coupled to the rear, or back, end of the piston 4 via the part 10, being mounted in an articulated manner on the said piston 4. The bearing 11 is thus in engagement with the part 10 cooperating with the back end of the piston 4.

At its other end, the cable 8 is fixed to the bearing 9, also of hemispherical shape. Naturally, the fork 25 is split locally for the insertion (mounting) of the cable 8 in a conventional manner.

Thus the cable 8 enters inside the piston in order to act in traction on the clutch release fork 25 when the chamber 6 is pressurised by means of the master cylinder 20 which is then subjected to the action of the clutch pedal, as seen in FIG. 2.

When the chamber 6 is depressurised, the piston 4, under the action of the load exerted by the diaphragm 27 of FIG. 1, occupies the position depicted in the lower part of FIG. 2, the spring 7 being compressed. The chamber 6 is thus of annular shape, being delimited by two concentric parts, namely the piston 4 with its guide part 15 and the cylinder 2. Axially, the concentric chamber 6 is thus closed and delimited by the part 15 and the nose 12. This chamber 6 extends axially on just one side with respect to the counter-support 5.

It will be noted that the nose 12 defines inside the cylinder 2 a shoulder 31 and that the hydraulic fluid inlet 18 is adjacent to this shoulder 31.

The return spring 7, here a coil spring, bears on this fixed shoulder 31 and on the axially movable guide part 15. Thus this spring 7 exerts a pre-loading action on the fork 25 and on the clutch release bearing 26 of FIG. 1. In addition, this spring 7, being of tapered shape, enables the two parts 4 and 15 of the piston to be connected together.

It will be noted that the part 15 is provided with shoulders in order to receive the collar 32 of the tubular part 4.

Naturally, the sealing joints 16 and 17 are associated respectively with the guide part 15 and the shoulder 31 of the nose 12 for the seated mounting of the piston 4. Only the joint 16 is axially movable, the joint 17 being carried by the fixed cylinder 2.

Thus the collar 32 of the tubular part 4 is sandwiched between the part 10 and the part 15, being permanently wedged under the action of the spring 7.

The plastic part 15 thus slides along the larger-diameter internal bore of the piston 2. Here, this internal bore is formed by a metal tube 35 moulded in one piece with the cylinder 2. Metal-on-plastic friction is thus obtained between the piston 4 and cylinder 2.

By virtue of these arrangements, an economical receiver of economical and simple form is obtained, which is easy to mount as initially the part 3 is not mounted and is not connected to the tubular cylinder 2 until the end, just like the piston 4.

The cable 8 is thus mounted so as to articulate on the piston 4 at the back end thereof.

In a variant, the control member 8 consists of a rod mounted in an articulated manner on the fork 25 and on the back end 32, 10 of the piston 4 nearest the cap 3 by virtue of the bearings 9, 11.

The rod passes through the piston 4, being mounted in an articulated manner on the back face of the piston 4 and the fork 25 by virtue of the control bearing 11 and drive bearing 9.

Thus, in all cases, when the piston 4 moves, a rectilinear movement thereof is obtained and a circular movement of the clutch release fork without the risk of jamming, the control member effecting a pendular movement with small clearance when the piston moves. This movement is less pronounced than if the control member had been coupled to the front end of the piston. It will be appreciated that the receiver 1 is axially compact by virtue of the projections 15, 12 and that only the joint 16 is axially movable.

The part 10 constitutes a load transfer part. Preferably, it is pierced right through by at least one sloping channel, for the discharge of air.

As will have been understood, according to one characteristic of the invention the piston 4 carries at its back end a guiding projection 15, whilst the cylinder has at its front end a guiding projection 12. The guiding projection 15 of the piston 4 is directed radially outwards, whilst the guiding projection 12 is directed radially inwards. The projection 15 is capable of cooperating with the inner bore of the cylinder 2, whilst the projection 12 is capable of cooperating with the outer periphery of the piston 4.

The joint 16 is installed on a circumference of diameter greater than that on which the joint 17 is installed and this is the reason why the spring 7 is of tapered form.

Naturally, as seen in FIG. 3, the nose 12 can be extended at the front by a tube 120 in order to protect the piston 4, having a guiding projection 150 in one piece. Here the cylinder 2 is made of aluminium and the return spring consists of a simple coil spring 70, the sealing joints 160, 170 being mounted in grooves made respectively at the outer periphery of the guiding projection 150 and at the inner periphery of the guiding nose 12 of the cylinder 2.

In this figure, the load transfer part 100 consists of a simple plate of reduced thickness at its outer periphery for bearing on the back end of the piston 4. The plate 100 is centred by the piston 4 with a bevelled end.

The bearing 110 is spherical. In a variant, FIG. 4, the protection of the piston can be effected with the aid of a bellows 220 mounted on the nose 12 by resting and clamped onto the cable 8.

In this figure the inlet 18 is inclined.

It will be appreciated that the cap 3 serves as a stop for the load transfer part 10, 100 and thus limits the movement of the piston.

This cap 3 also has a protective role and prevents dirt, impurities or other substances from entering inside the cylinder 2.

Naturally, this cap 3 can be mounted by being screwed onto the cylinder 2.

Generally, the cap 3 facilitates the mounting of the cylinder while being installed last.

It will be appreciated that the guiding projection 12 of the cylinder 2 is also used for fixing the receiver 1 to the counter-support 5 and that the return spring 7, 70, usually referred to as a pre-loading spring, is housed in the chamber 6.

I claim:

1. Hydraulic clutch control, having a clutch release fork (25) capable of being mounted pivoting on a fixed support, a control member (8) capable of acting in traction on the clutch release fork (25), being mounted in an articulated manner on said fork by means of a drive bearing (9), a hydraulic receiver (1) having a fixed cylinder (2, 3) mounted on a counter-support (5) fixed to the fixed support and a piston (4, 10) engaged so as to slide sealingly in the cylinder (2, 3) and defining therein a chamber (6) of variable volume connected to a transmitter (20) capable of being activated by a clutch pedal (24), characterized in that the cylinder (2) is of tubular shape, in that the piston (4) is of tubular shape and carries at a back end a guiding projection (15, 150) designed to cooperate with the internal bore of the cylinder (2) and directed radially outwards, whilst the cylinder (2) has at a front end a guiding projection (12) designed to cooperate with the outer periphery of the piston (4) and directed radially inwards, and in that the control member (8) enters inside the piston (4) of the hydraulic receiver (1) and is mounted at one of its ends in an articulated manner on the clutch release fork (25) and at the other of its ends so as to articulate on the back face of the piston (4) of the hydraulic receiver (1).

2. Hydraulic clutch control according to claim 1, characterized in that the control member (8) consists of a rod mounted in an articulated manner on the clutch release fork (25) and in an articulated manner on the back end of the piston (4).

3. Hydraulic clutch control according to claim 1, characterized in that the control member (8) is a cable acting between two bearings (11, 9) coupled respectively to the back end of the piston (4) and to the clutch release fork (25).

4. Hydraulic clutch control according to claim 1, characterized in that the cylinder (2) has a back face closed by a closing cap (3) attached to the cylinder (2).

5. Hydraulic clutch control according to claim 4, characterized in that the front end of the cylinder (2) has a nose (12) by means of which the cylinder (2) bears against its counter-support (5) fixed to a fixed part.

6. Hydraulic clutch control according to claim 5, characterized in that the nose (12) offers a transverse shoulder (30) for its counter-support (5).

7. Hydraulic clutch control according to claim 6, characterized in that the counter-support (5) is sandwiched between the shoulder (30) of the nose (12) and a thrust washer (13) fixed axially on the nose (12).

8. Hydraulic clutch control according to claim 5, characterized in that the nose (12) of the cylinder (2) constitutes the guiding projection for the piston (4).

9. Hydraulic clutch control according to claim 1, characterized in that the piston is in two parts and has a tubular guide part (4) and a part (15) forming the guiding projection, held together by a pre-loading spring (7) bearing on a shoulder (31) formed by the guiding projection (12) of the cylinder (2) and on the guide part (15) in order to exert a pre-load on the control member (8) and in that the tubular part (4) has at its back end a collar (32) for retaining the guide part (15).

10. Hydraulic clutch control according to claim 1, characterized in that the control member (8) is mounted so as to articulate on the piston (4) by means of a bearing (11) in engagement with a load transfer part (10, 100) cooperating with the back end of the piston (4).

* * * * *